United States Patent [19]

Berry

[11] Patent Number: 5,170,864
[45] Date of Patent: Dec. 15, 1992

[54] ELEVATOR BRIDGE APPARATUS

[76] Inventor: Ruby D. Berry, 1305 Paradise Dr., Highland, Ill. 62249

[21] Appl. No.: 797,374

[22] Filed: Nov. 25, 1991

[51] Int. Cl.⁵ .............................................. B66B 13/28
[52] U.S. Cl. ........................................ 187/51; 187/62; 187/98
[58] Field of Search ................... 187/1 R, 51, 62, 98; 14/1, 2.4, 69.5, 71.1

[56] References Cited

U.S. PATENT DOCUMENTS

| | | | |
|---|---|---|---|
| 2,120,081 | 6/1938 | Alexander | 187/62 X |
| 2,473,125 | 6/1939 | Alexander | 187/98 |
| 2,473,127 | 6/1949 | Alexander | 187/98 |
| 3,806,976 | 4/1974 | Yoon | 14/69.5 X |
| 4,443,905 | 4/1984 | Kopp | 14/69.5 |

Primary Examiner—Robert P. Olszewski
Assistant Examiner—Dean A. Reichard
Attorney, Agent, or Firm—Leon Gilden

[57] ABSTRACT

An apparatus is arranged to provide for a bridge from an elevator floor relative to an associated building floor to limit jarring and balancing associated in the transport of various carts thereacross, as well as limiting an effective spacing or gap between the elevator floor and the dwelling floor in use.

3 Claims, 4 Drawing Sheets

ELEVATOR BRIDGE APPARATUS

BACKGROUND OF THE INVENTION

1. Field of the Invention

The field of invention relates to elevator apparatus, and more particularly pertains to a new and improved elevator bridge apparatus to limit a gap effected between an elevator floor and a dwelling floor.

2. Description of the Prior Art

Transport devices are utilized throughout the prior art and particularly when transporting a cart across an elevator threshold onto a building floor, frequently a spacing is effected if not an elevational spacing as well providing for a projection forming a hazard in transporting of vehicles, as well as individuals stepping from and into the elevator relative to the building floor.

Various transport devices are utilized throughout the prior art wherein components for filling a crack and the like is exemplified in a design patent 290,219 to Boone formed as a plate-like member with a medially positioned handle.

U.S. Pat. No. 4,502,814 to Trimble sets forth a crack and joint overlay to effect filling of a crack and joint by a filler material.

Accordingly, it may be appreciated that there continues to be a need for a new and improved elevator bridge apparatus as set forth by the invention which addresses both the problems of ease of use as well as effectiveness in construction and in this respect, the present invention substantially fulfills this need.

SUMMARY OF THE INVENTION

In view of the foregoing disadvantages inherent in the known types of elevator apparatus now present in the prior art, the present invention provides an elevator bridge apparatus wherein the same is directed to effect the positioning of adjacent plate-like members to minimize a bridge and gap effected by an elevator relative to a dwelling floor. As such, the general purpose of the present invention, which will be described subsequently in greater detail, is to provide a new and improved elevator bridge apparatus which has all the advantages of the prior art elevator apparatus and none of the disadvantages.

To attain this, the present invention provides an apparatus arranged to provide for a bridge from an elevator floor relative to an associated building floor to limit jarring and balancing associated in the transport of various carts thereacross, as well as limiting an effective spacing or gap between the elevator floor and the dwelling floor in use.

My invention resides not in any one of these features per se, but rather in the particular combination of a all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved elevator bridge apparatus which has all the advantages of the prior art elevator apparatus and none of the disadvantages.

It is another object of the present invention to provide a new and improved elevator bridge apparatus which may be easily and efficiently manufactured and marketed.

It is a further object of the present invention to provide a new and improved elevator bridge apparatus which is of a durable and reliable construction.

An even further object of the present invention is to provide a new and improved elevator bridge apparatus which is susceptible of a low cost of manufacture with regard to both materials and labor, and which accordingly is then susceptible of low prices of sale to the consuming public, thereby making such elevator bridge apparatus economically available to the buying public.

Still yet another object of the present invention is to provide a new and improved elevator bridge apparatus which provides in the apparatus and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
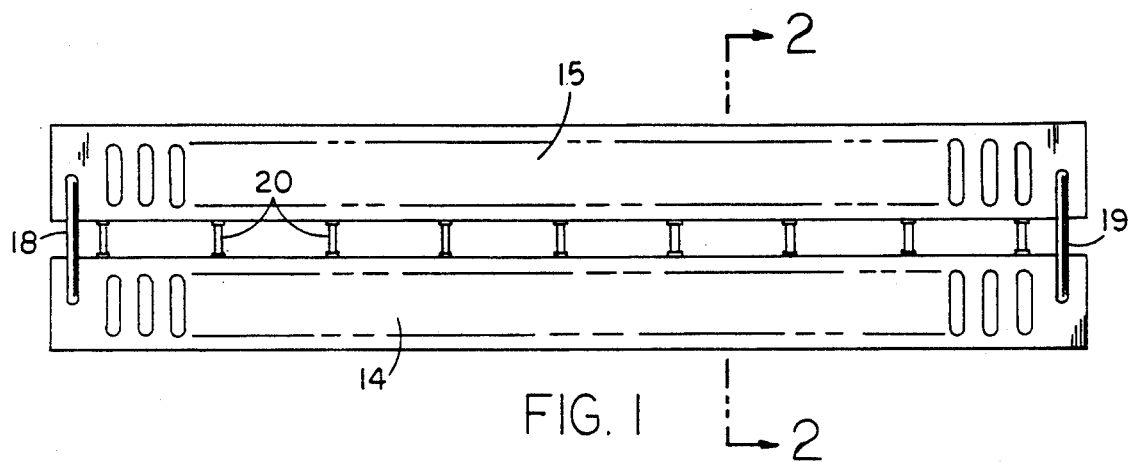
FIG. 1 is an orthographic top view of the instant invention.
Figure 2:
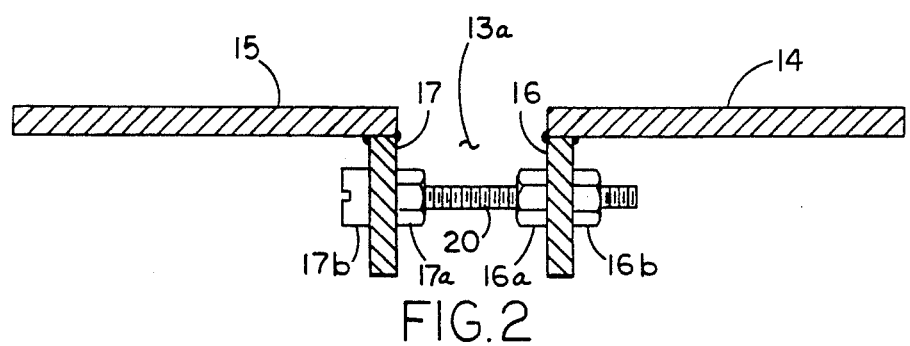
FIG. 2 is an orthographic view, taken along the lines 2—2 of FIG. 1 in the direction indicated by the arrows.
Figure 3:
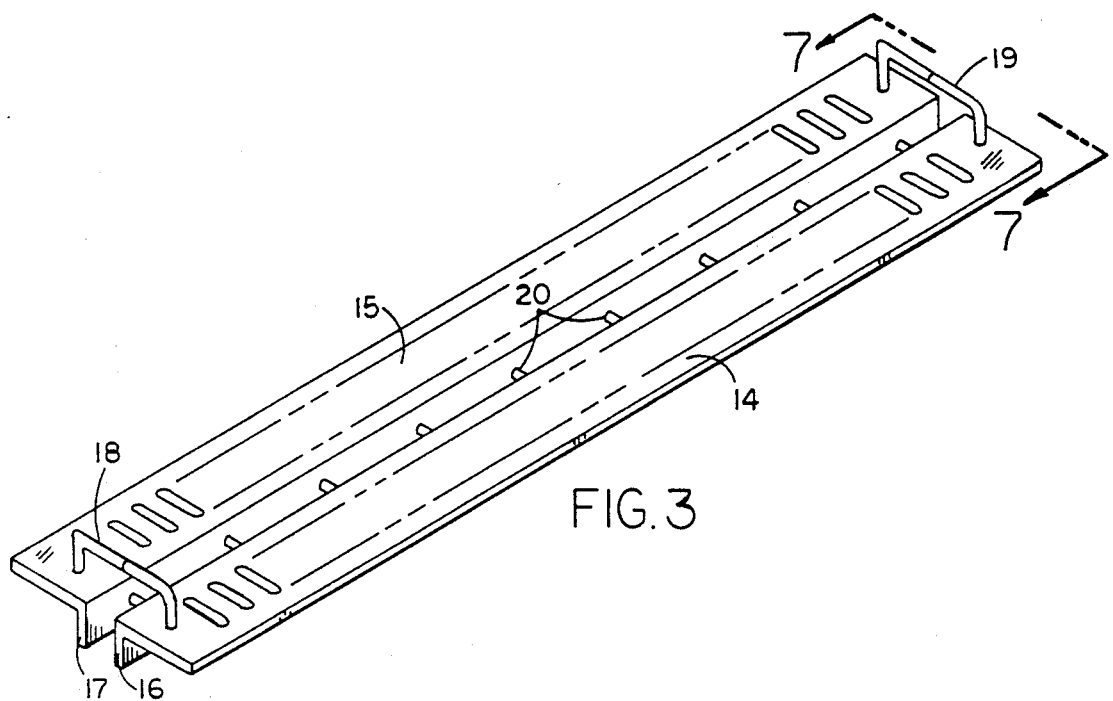
FIG. 3 is an isometric illustration of the instant invention.

With reference now to the drawings, and in particular to FIGS. 1 to 7 thereof, a new and improved elevator bridge apparatus embodying the principles and concepts of the present invention and generally designated by the reference numeral 10 will be described.

More specifically, the elevator bridge apparatus 10 of the instant invention essentially comprises the organization for use relative to an elevator that includes an elevator floor 11 (see FIG. 4) that is operative to a building floor 12. Typically, it is attempted to align in a planar relationship an elevator floor 11 relative to the building floor 12, but frequently this is not the case and at all times, a gap 13 is present between the elevator floor 11 and the building floor 12 when the elevator body is positioned and the door is opened relative to the floor 12. The gap 13 is defined by a predetermined width and of course will vary from building to building and from floor to floor typically. In this regard, the apparatus includes a first horizontal support plate 14 arranged in a coplanar and coextensive relationship, with a second horizontal support plate 15. The first plate 14 is spaced from the second plate 15 a second predetermined width less than the first predetermined width defined by the gap 13. A first vertical plate 16 is orthogonally and coextensively mounted to a forward edge of the first horizontal support plate 14 extending downwardly therefrom, with a second vertical plate 17 spaced from and parallel the first vertical plate 16 in a coextensive relationship orthogonally mounted to a forward distal end of the second plate 15 to space the first vertical plate 16 relative to the second vertical plate 17 the predetermined second width.

Figure 7:
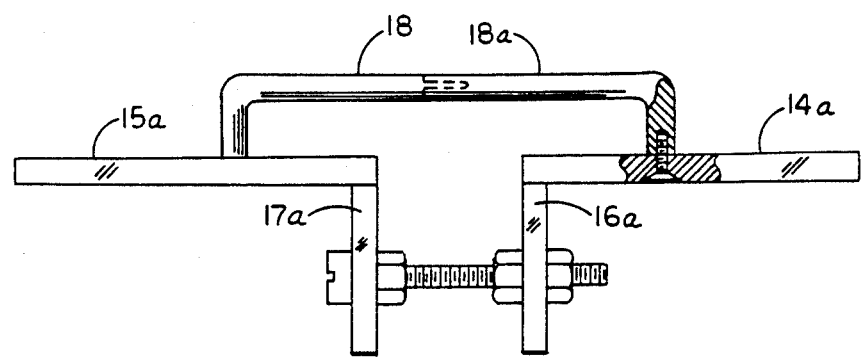
FIG. 7 is a modified aspect of the invention illustrating the use of transparent horizontal support plates.
Figure 4:
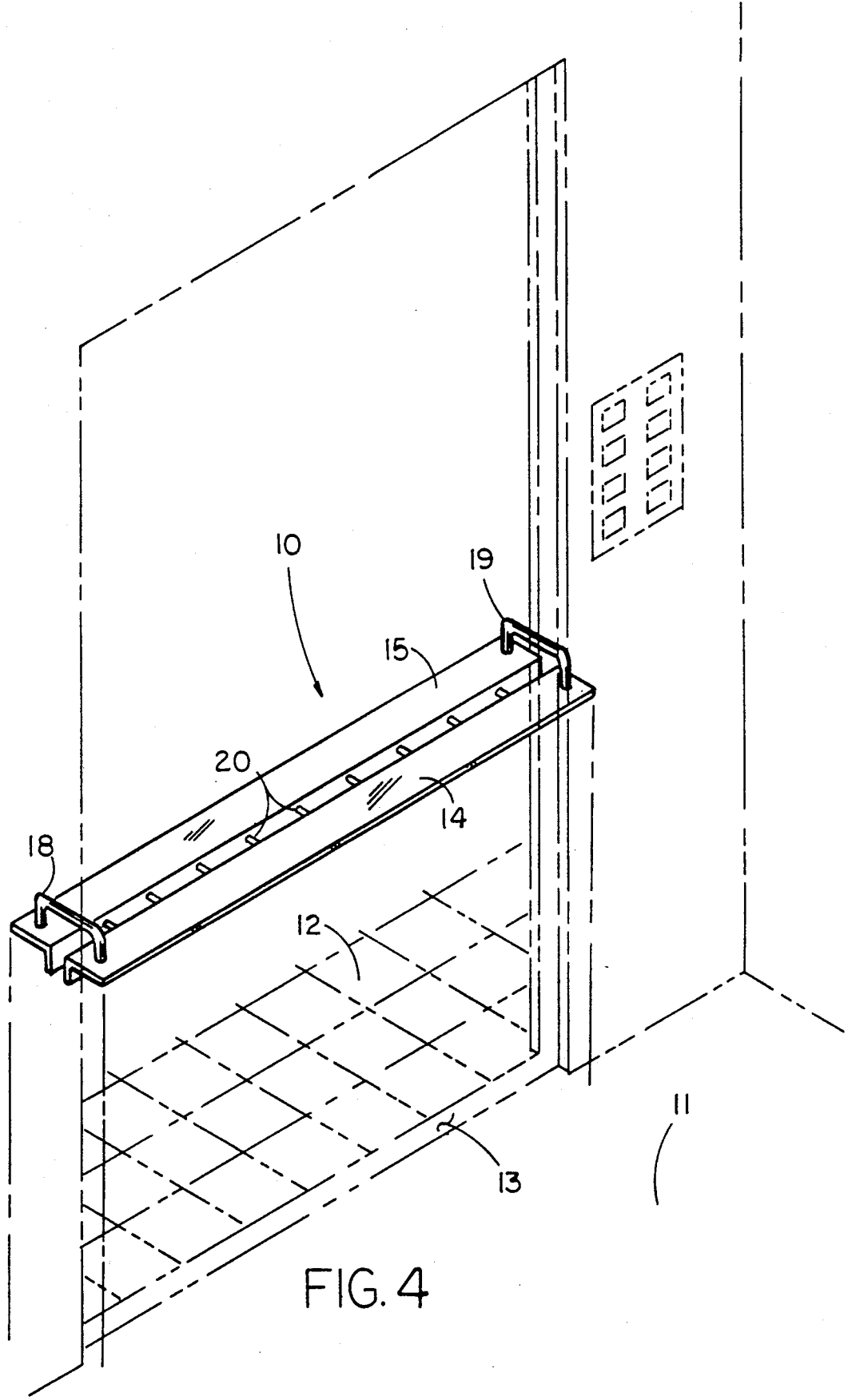
FIG. 4 is an isometric illustration of the invention in use.

A "U" shaped handle 18 and a second "U" shaped handle 19 are mounted adjacent opposed distal ends of the first and second horizontal plates 14 and 15, wherein each handle spans the gap 13. Each handle is provided with a slip fit relationship between adjacent inter-fitting "L" shaped handle portions, as illustrated in FIG. 7 for example, to permit sliding fit of the handles relative to one another to accommodate spacing of the associated second gap 13a defined by the spacing between the first and second vertical plate 16 and 17. A plurality of connecting rods 20 arranged in a parallel relationship below the horizontal plates 14 and 15 are orthogonally directed medially of the vertical plates 16 and 17 and spaced along at a predetermined spacing relative to one another. Respective first and second vertical plate interior and exterior fasteners 16a and 16b are mounted to an interior and exterior surface of the first vertical plate 16, with a second interior and exterior fastener 17a and 17b mounted to an interior and exterior face respectively of the second vertical plate 17 to permit relative loosening of the fasteners to adjust the second gap 13a to accommodate positioning of the vertical plates within the first gap 13.

Figure 5:
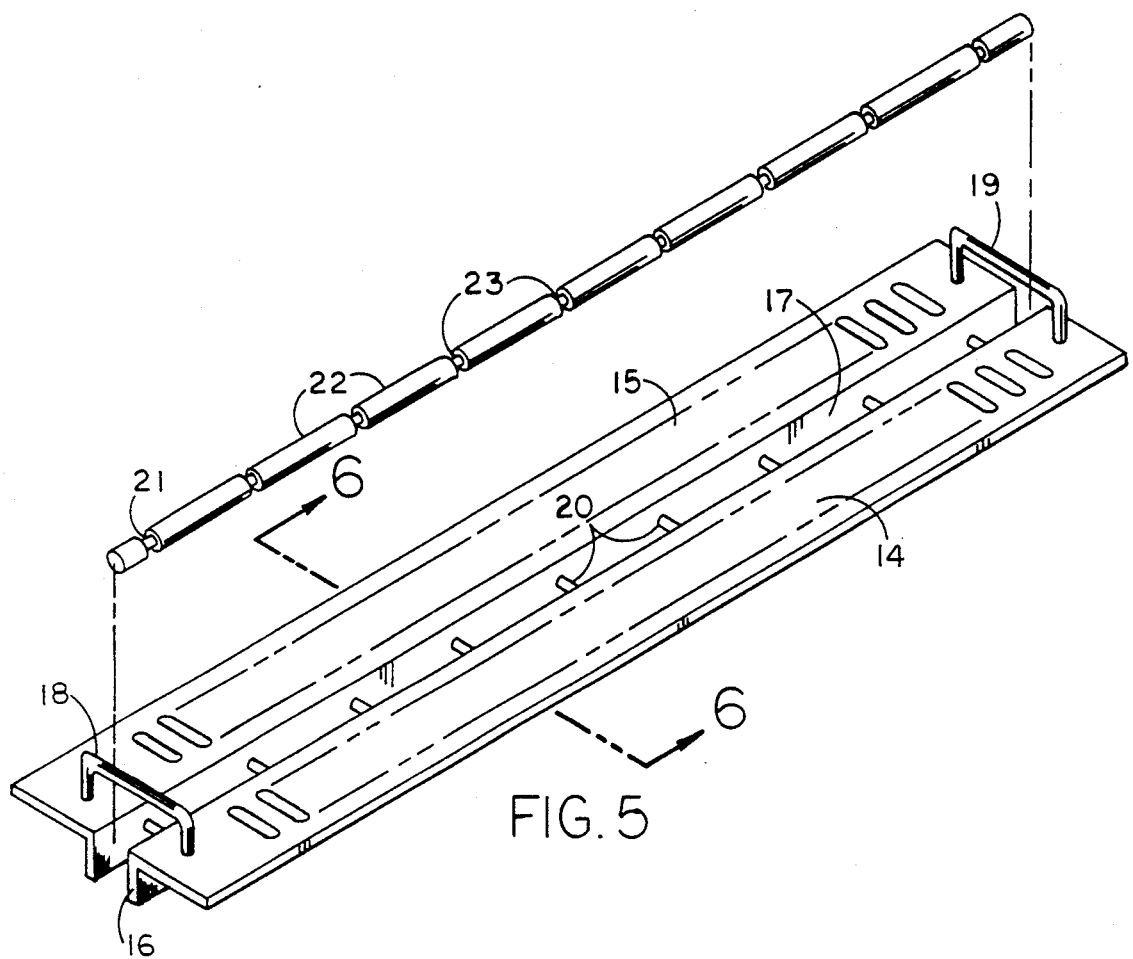
FIG. 5 is an isometric illustration of a modification of the invention.
Figure 6:
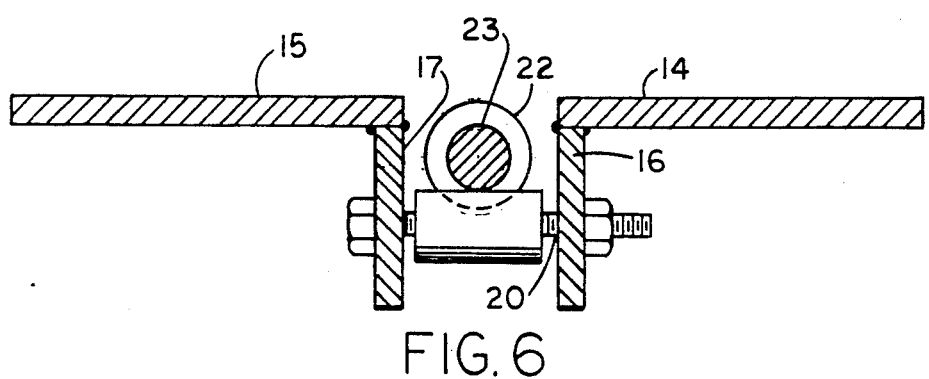
FIG. 6 is an orthographic view, taken along the lines 6—6 of FIG. 5 in the direction indicated by the arrows.

The FIGS. 5 and 6 illustrate the use of a roller rod 21 positioned coextensively within the second gap 13, including a plurality of rollers 22 rotatably mounted thereabout, wherein each of the rollers are spaced apart a roller gap 23, wherein the roller gaps are spaced apart in a spacing equal to the predetermined spacing of the connecting rods 20 to permit positioning of at least one roller 22 between adjacent connecting rods 20. In this manner, the rollers 22 provide for interim support surface of individual or vehicle directed across the second gap 13a. Further, the exterior cylindrical surface of each roller 22 is positioned in tangential alignment with the first and second horizontal support plates 14 and 15.

Accordingly, it may be appreciated that the organization is arranged to provide for a surface support to minimize spacing of the elevator floor relative to the building floor permitting an individual or vehicle ease of movement relative to the floors in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling withing the scope of the invention.

What is claimed as being new and desired to be protected by Letters Patent of the United States is as follows:

1. An elevator bridge apparatus for use between an elevator floor and a building floor defining a first gap between the elevator floor and the building floor, wherein the apparatus comprises, a first horizontal support plate spaced from a second horizontal support plate in a coplanar coextensive relationship, wherein the first horizontal support plate is spaced from the second horizontal support plate a second gap less than the first gap, and including securement means to adjustably secure the first horizontal support plate relative to the second horizontal support plate, and the first horizontal support plate includes an interior edge positioned adjacent the second horizontal support plate, and the second horizontal support plate includes a second horizontal support plate interior edge spaced from and adjacent the first horizontal support plate, and a first vertical plate mounted orthogonally to the first horizontal support plate interior edge, and a second vertical plate mounted orthogonally and integrally to the second horizontal support plate interior edge, wherein the first vertical plate and the second vertical plate are spaced apart in a parallel coextensive relationship spaced apart a spacing equal to the second gap, and the securement means includes a plurality of connecting rods directed medially and orthogonally through the first vertical plate and the second vertical plate, and wherein each connecting rod of said plurality of connecting rods is spaced apart a predetermined distance from the connecting rod to either side and each connecting rod includes a first vertical plate interior fastener and a first vertical plate exterior fastener mounted to a respective interior and exterior surface of the first vertical plate on opposed sides thereof, and a second vertical plate interior fastener and a second vertical plate exterior fastener mounted to an interior and exterior surface of the second vertical plate on opposed sides thereof, wherein the fasteners permit spacing of the first vertical plate relative to the second vertical plate.

2. An apparatus as set forth in claim 1 including a first handle mounted orthogonally between the first horizontal support plate and the second horizontal support plate at a first distal end of the first horizontal support plate and the second horizontal support plate, and a second handle mounted to a second distal end of the first horizontal support plate and the second horizontal support plate, wherein the first handle and the second handle are arranged for adjustment between the first horizontal support plate and the second horizontal support plate.

3. An apparatus as set forth in claim 2 including a roller rod positioned within the second gap between the first vertical plate and the second vertical plate, and the roller rod including a plurality of rollers rotatably mounted about the roller rod, and the rollers being spaced apart a spacing equal to the predetermined distance to position at least one roller between adjacent connecting rods of the plurality of connecting rods.

* * * * *